United States Patent [19]

Takemura

[11] Patent Number: 4,903,779
[45] Date of Patent: Feb. 27, 1990

[54] HYDRAULIC CONTROL APPARATUS FOR TRACTOR

[75] Inventor: Toshihiko Takemura, Osaka, Japan

[73] Assignee: Kubota, Ltd., Osaka, Japan

[21] Appl. No.: 274,842

[22] Filed: Nov. 22, 1988

[30] Foreign Application Priority Data

Dec. 4, 1987 [JP] Japan ............... 62-308386
Dec. 4, 1987 [JP] Japan ............... 62-308387
Dec. 4, 1987 [JP] Japan ............... 62-308388

[51] Int. Cl.$^4$ ............................. A01B 63/112
[52] U.S. Cl. ................................ 172/10; 172/7; 280/446.1
[58] Field of Search ............ 172/239, 7, 236, 9, 172/10; 74/479, 480 R; 280/446.1

[56] References Cited

U.S. PATENT DOCUMENTS

| RE. 25,512 | 1/1964 | Presnell et al. | 172/10 X |
|---|---|---|---|
| 3,123,152 | 3/1964 | Biskis | 172/239 |
| 3,294,179 | 12/1966 | Bunting et al. | 172/7 X |
| 3,331,447 | 7/1967 | Simak | 172/9 |
| 3,489,224 | 1/1970 | Bunting | 172/9 |
| 3,653,446 | 4/1972 | Kalmon | 172/9 X |
| 3,901,323 | 8/1975 | Mueller, Jr. | 172/7 |
| 4,085,806 | 4/1978 | Osujyo et al. | 172/7 X |
| 4,418,758 | 12/1983 | Fujimoto | 172/7 |
| 4,463,658 | 8/1984 | Heiser et al. | 172/7 X |

FOREIGN PATENT DOCUMENTS

| 709163 | 5/1965 | Canada | 172/7 |
|---|---|---|---|
| 58-29041 | 2/1983 | Japan . | |
| 61-25324 | 2/1986 | Japan . | |

OTHER PUBLICATIONS

Götz, Werner, "Hydraulics, Theory and Applications, From Bosch," 1984, pp. 340-342.

*Primary Examiner*—Randolph A. Reese
*Assistant Examiner*—Jeffrey L. Thompson
*Attorney, Agent, or Firm*—Birch, Stewart, Kolasch & Birch

[57] ABSTRACT

A hydraulic control apparatus for a tractor comprising a control valve for a hydraulic unit for a work device, a position control lever and a draft control lever for changing over the valve through position and draft link assemblies, a position feedback assembly, a draft feedback assembly for switching the valve to maintain the draft on the work device at an approximately constant value, and a position control spool operating arm and a draft control spool operating arm arranged above and below the spool of the valve in intersecting relation thereto, the draft feedback assembly being interlocked with the draft link assembly. The control valve is disposed under the case of the hydraulic unit, while the link assemblies are accommodated in a space inside one side wall of the case and having an open lower side to make the apparatus easy to assemble.

14 Claims, 9 Drawing Sheets

HYDRAULIC CONTROL APPARATUS FOR TRACTOR

FIELD OF THE INVENTION AND RELATED ART STATEMENT

The present invention relates to a hydraulic control apparatus for tractors.

The work to be performed by various work devices attached to tractors generally utilizes position control for controlling the work device to a specified position according to the set position of a position control lever, and draft control for controlling the draft load on the work device to a substantially constant value according to the set position of a draft control lever.

Conventional hydraulic control apparatus having such control functions includes the apparatus disclosed in Examined Japanese Patent Publication No. SHO 58-29041 (conventional apparatus 1), the apparatus disclosed in Examined Japanese Patent Publication No. SHO 61-25324 (conventional apparatus 2), etc.

The conventional apparatus includes a single control valve which is operable through a link assembly by a position control lever and a draft control lever for effecting predetermined position control and draft control according to the set positions of the levers respectively.

The conventional apparatus 2 comprises a control valve having a spool and a spool operating arm connected to the spool in intersecting relation therewith, and the operating arm has one end connected to a position control lever through a link assembly and the other end connected to a feedback assembly to effect predetermined position control.

With the conventional apparatus 1, however, the link assembly has a very complex construction, which makes it impossible to provide the control valve and the link assembly under the cylinder portion of the hydraulic unit, so that the control valve and the link assembly are disposed beside the cylinder portion. The apparatus therefore has the drawback of being unusable for small- and medium-sized tractors having a small body width.

With the conventional apparatus 2, the control valve, the spool operating arm, etc. are arranged under the cylinder portion, and the link assembly and the feedback assembly are disposed on the respective sides thereof. The apparatus is therefore satisfactorily usable for small tractors, but is adapted only for position control and is unable to effect draft control.

In the case of such hydraulic control apparatus for tractors, the control valve is provided within the case of the hydraulic unit, and a control rod coupled to the control lever is inserted through and supported by a support member, which is attached to the case so that the control rod extends into the case through an opening formed therein. The link assembly for coupling the control rod to the control valve is incorporated in the case.

The inner end of the control rod is connected to a portion of the link assembly or to the entire link assembly. Nevertheless, since the link assembly can not be inserted into the case through the opening, it is conventionally necessary to incorporate the control rod into the case first and to thereafter connect the control rod to the link assembly within the case. This procedure is very cumbersome and inefficient.

OBJECTS AND SUMMARY OF THE INVENTION

The present invention has been accomplished to overcome the foregoing problems heretofore encountered.

A first object of the present invention is to provide a hydraulic control apparatus which is simple and compact in construction and which is adapted for position control and draft control with a single control valve.

A second object of the invention is a hydraulic control apparatus of the type mentioned above which is adapted to forcibly lift the work device during draft control simply by shifting the draft control lever toward the lifting direction without permitting the operation of the relief valve of the hydraulic circuit in the lifted position.

A third object of the invention is to provide a hydraulic control apparatus which is easy to assemble since control rods and link assemblies, as mounted on a support member, can be attached to a hydraulic case.

To fulfill these objects, the present invention provides apparatus having the following features.

More specifically stated, the present invention provides a hydraulic control apparatus for a tractor comprising a control valve 10 for controlling a hydraulic unit 2 for lifting a work device to a lifting, stopping or lowering direction, a position control lever 15 and a draft control lever for changing over the control valve 10 to a lifting, stopping or lowering position through position and draft link assemblies 39, 41 respectively, a position feedback assembly 63 for returning the control valve 10 to the stopping position when the work device is lifted or lowered to a position set by the position control lever 15, a draft feedback assembly 80 for switching the control valve 10 to maintain the draft load on the work device at an approximately constant value according to the set position of the draft control lever 16, and a position control spool operating arm 40 connected to the spool 11 of the control valve 10 in intersecting relation therewith and having one end connected to the position link assembly 39 and the other end connected to the position feedback assembly 63, the apparatus being characterized in that a draft control spool operating arm 42 separate from the arm 40 is connected to the spool 11 in intersecting relation therewith and has one end connected to the draft link assembly 41 and the other end connected to a fixed member, the draft feedback assembly 80 being connected with the draft link assembly 41.

According to a second aspect, the invention provides a hydraulic control apparatus for a tractor comprising a control valve 10 for controlling a hydraulic unit 2 for lifting a work device to a lifting, stopping or lowering direction, a position control lever 15 and a draft control lever for changing over the control valve 10 to a lifting, stopping or lowering position through position and draft link assemblies 39, 41 respectively, a position feedback assembly 63 for returning the control valve 10 to the stopping position when the work device is lifted or lowered to a position set by the position control lever 15, a draft feedback assembly 80 for switching the control valve 10 to maintain the draft load on the work device at an approximately constant value according to the set position of the draft control lever 16, and a position control spool operating arm 40 connected to the spool 11 of the control valve 10 in intersecting relation therewith and having one end connected to the position link assembly 39 and the other end connected to the position feedback assembly 63, the apparatus being characterized in that a draft control spool operating arm 42 separate from the arm 40 is connected to the spool 11 in intersecting relation therewith and has one end connected to the draft link assembly 41 and the other end operatively connected to the position feedback assembly 63 so as to substantially fix said other end and return the control valve 10 to its stopping position when the work device is in a lifted position during draft control, the draft feedback assembly 80 being connected with the draft link assembly 41.

According to a third aspect, the invention provides a hydraulic control apparatus for a tractor comprising a hydraulic unit 2 mounted on the body 1 of the tractor for lifting a work device, a control valve 10 disposed under the hydraulic unit 2 in an open portion of the case 3 thereof for controlling the hydraulic unit 2, control rods 22, 23 rotatably inserted through a support member 25 attached to one side wall 89 of the case 3, control levers 15, 16 connected to the outer ends of the respective control rods 22, 23, and link assemblies 39, 41 provided within the case 3 for coupling the respective control rods 22, 23 to the control valve 10, the apparatus being characterized in that a cutout portion 101 having an open lower side is formed in the side wall 89 of the case 3, the support member 25 being attached to the side wall 89 to cause the control rods 22, 23 to extend through the cutout portion 101 and close the cutout portion 101.

BRIEF DESCRIPTION OF THE DRAWINGS

FIG. 1 is a side elevation partly broken away and showing the hydraulic control apparatus;

FIG. 2 is a rear view in section showing the apparatus;

FIG. 3 is a plan view showing a control valve portion;

FIG. 4 is a side elevation partly broken away and illustrating control operation;

FIG. 5 a plan view of the valve portion for illustrating the operation;

FIG. 6 is a side elevation partly broken away and illustrating a draft control operation;

FIG. 7 is a plan view of the valve portion for illustrating the operation;

FIG. 8 is a rear view in section showing the apparatus;

FIG. 9 is a plan view in section showing an interlocking lever portion;

FIG. 10 is a side elevation showing the same portion;

FIG. 11 is a side elevation partly broken away and showing the apparatus;

FIG. 12 is a rear view in section showing the same apparatus;

FIG. 13 is a sectional view showing a top link holder portion; and

DESCRIPTION OF THE PREFERRED EMBODIMENTS

The present invention will be described below in detail with reference to the illustrated preferred embodiments.

FIGS. 1 to 7 show a first embodiment of the invention.

Figure 1:
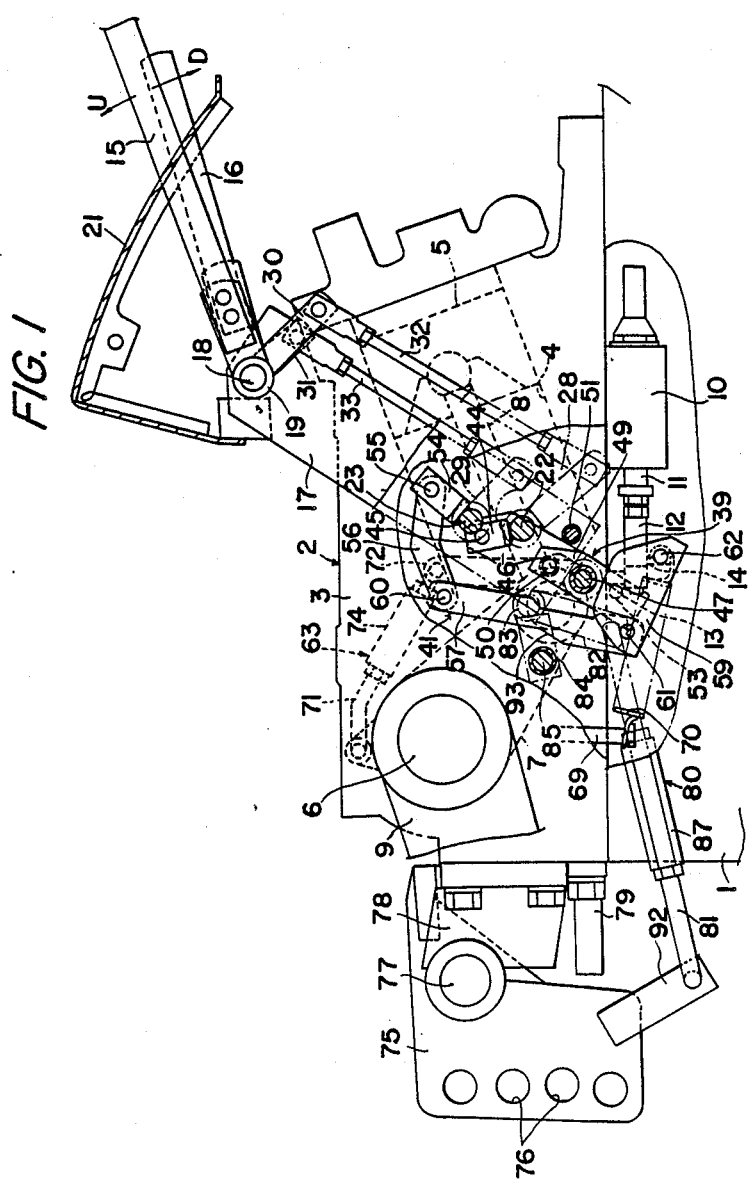
FIG. 1 to FIG. 7 show a first embodiment of the invention, i.e., a hydraulic control apparatus.
Figure 2:
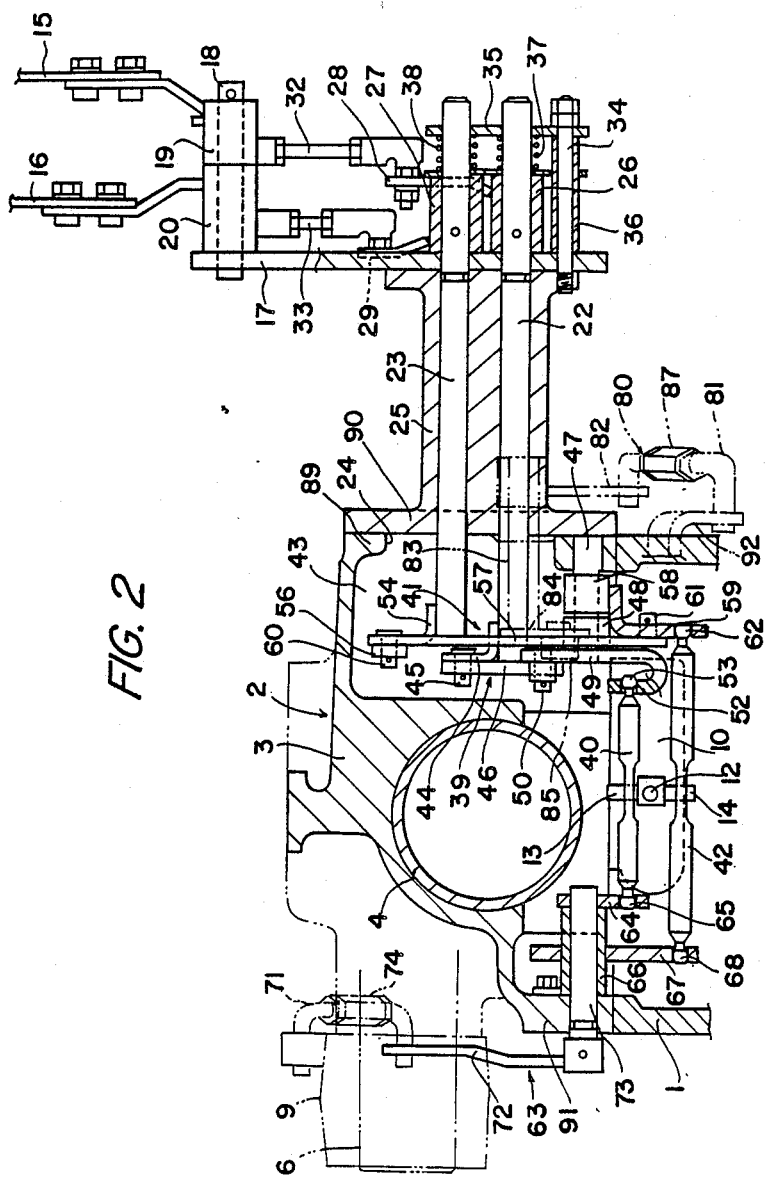
Figure 3:
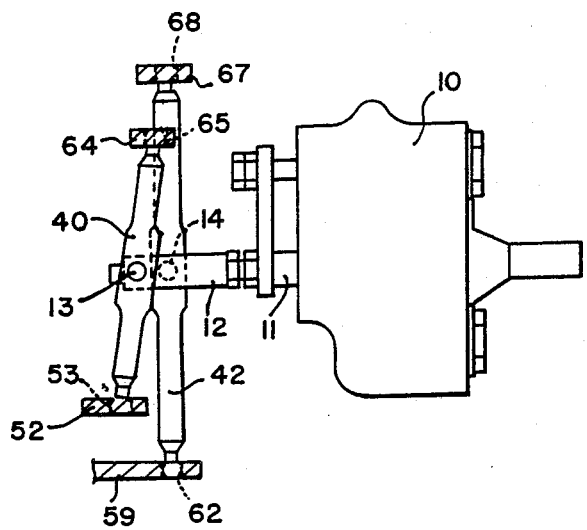

Referring to FIGS. 1 to 3, a tractor body 1 comprises a transmission case, etc. A hydraulic unit 2 for lifting or lowering a working device has a hydraulic case 3 mounted on the rear portion of the tractor body 1 and having a cylinder portion 4 therein. A piston 5 slidably fitted in the cylinder portion 4 is operatively connected to a hydraulic arm 7 on a hydraulic arm shaft 6 supported by the case 3, such that the sliding movement of the piston 5 causes lift arms 9 on the respective ends of the arm shaft 6 to lift or lower the work device. A control valve 10 for controlling the hydaulic unit 2 in a lifting, stopping or lowering direction is secured to the lower side of the cylinder portion 4 within the hydraulic case 3 which is opened downward. The control valve 10 has a spool 11 which is slidable forward or rearward. The spool 11 has at its rear end a rod 12 provided with a pair of joint pins 13, 14 disposed above and below the spool and spaced apart from each other in the direction of movement of the spool. The spool 11 is biased in the lowering direction by an internal spring.

A position control lever 15 and a draft control lever 16 are supported by boss portions 19, 20 on a lever shaft 18 secured to a support plate 17 which is disposed at one side of the hydraulic unit 2. These control levers are pivotally movable forward or rearward along a guide plate 21 secured to the support plate 17. A position control rod 22 and a draft control rod 23 laterally extend through and are rotatably supported by a support member 25 attached to a side wall 89 of the hyraulic case 3 and closing an opening 24 formed in the wall 89. These control rods 22, 23 are operatively connected to the position control lever 15 and the draft control lever 16, respectively, by links 28, 29 on boss portions 26, 27 secured to the outer ends of the rods 22, 23, links 30, 31 secured to the boss portions 19, 20, and rods 32, 33 connecting the links 28, 29 to the links 30, 31. The support plate 17 is fixed to the outer end of the support member 25 with a bolt 34. A spring retaining plate 35 is fixed to the support member 25 by the bolt 34, with a collar 36 provided therebetween. Between the spring retaining plate 35 and the boss portions 26, 27, springs 37, 38 are fitted around the control rods 22, 23, respectively. The springs 37, 38 offer predetermined resistance to the control rods 22, 23 when the control levers are manipulated.

The position control rod 22 is operatively connected to a spool operating arm 40 for position control by a position link assembly 39. The draft control rod 23 is operatively connected to a spool operating arm 42 for draft control by a draft link assembly 41. These link assemblies 39, 41 are accommodated in a downwardly open space 43 provided between the cylinder portion 4 and the side wall 89 of the hydraulic case 3.

The position link assembly 39 has a position cam 46 pivoted by a pin 45 to a link 44 secured to the inner end of the position control rod 22, and a position link 49 pivotably supported at an intermediate boss portion 48 by a fixed shaft 47 projecting inward from the side wall 89 of the hydraulic case 3. The position link 49 is provided at its upper end with an engaging pin 50. In corresponding relation to the engaging pin 50, a fixed pin 51 extends inward from a flange 90 of the support member 25. The lower end of the position cam 46 is movable into or out of the space between the engaging pin 50 and the fixed pin 51. Accordingly, this movement of the position cam 46 pivotally moves the position link 49 about the fixed shaft 47. The lower portion of the position link 49 is bent to a J-shape as at 52, and a ball joint portion 53 at one end of the spool operating arm 40 for position control is removably fitted to the bent portion 52.

The draft link assembly 41 has a connecting link 56 pivoted by a pin 55 to a link 54 secured to the inner end of the draft control rod 23, a draft operating link 57 extending generally vertically and disposed to the rear of the fixed shaft 47, and a draft link 59 rotatably supported at a boss portion 58 by the fixed shaft 47. The upper end of the draft operating link 57 is connected to the rear end of the connecting link 56 by a pin 60, while the lower end of the link 57 is connected to the rear end of the draft link 59 by a pin 61. A ball joint portion 62 at one end of the spool operating arm 42 for draft control is removably fitted to the front end of the draft link 59.

The operating arms 40, 42 are arranged above and below the rod 12, respectively, and are in intersecting relation with the spool 11 approximately at right angles therewith. The arms 40, 42 are supported each at the lateral midportion thereof by the joint pins 13, 14, respectively, and are each movable about the pin. The other end of the arm 40 is connected by a ball joint portion 65 to a feedback link 64 of a position feedback assembly 63. The other end of the arm 42 is connected by a ball joint portion 68 to a bracket 67 which is fixed by a support sleeve 66 to the case 3. The spool operating arm 42 for draft control has attached to its front end a tension spring 70 connected to a spring engaging pin 69 provided at a rear end position.

The position feedback assembly 63 functions to return the control valve 10 to a stop (neutral) position when the work device is lifted or lowered to a position set by the position control lever 15. The assembly 63 is provided on the other side of the case 3 opposite to one side thereof where the link assemblies 39, 41 are disposed. The feedback assembly 63 comprises a feedback rod 71, feedback lever 72, feedback lever shaft 73 and feedback link 64. The shaft 73 is inserted through the support sleeve 66 and laterally extends through and is supported by the other side wall 91 of the hydraulic case 3. The feedback link 64 is secured to the inner end of the shaft 73, and the lever 72 to the outer end thereof. The lever 72 is connected by the rod 71 to the upper side of the base portion of one of the lift arms 9. The feedback rod 71 is adjustable in length by a turnbuckle 74. The feedback lever shaft 73 is positioned in alignment with the fixed shaft 47.

A top link holder 75 has a plurality of attaching holes 76 arranged vertically and is pivoted by a torsion bar 77 to a bracket 78 on the rear end of the case 3. The holder 75 comes into contact with a stopper 79 projecting from the rear end of the case 3 when the torsion bar 77 is twisted by a draft load from the work device during draft control.

A draft feedback assembly 80 functions to switch the control valve 10 in accordance with the setting of the draft control lever 16 so as to make the draft load of the work device approximately definite. The assembly 80 comprises a bracket 92 secured to the top link holder 75, feedback rod 81, feedback lever 82, feedback lever shaft 83, feedback link 84 and engaging pin 85. The lever shaft 83 laterally extends through and is rotatably supported by the flange 90 of the support member 25. The lever 82 is secured to the outer end of the shaft 83, and the link 84 to the inner end thereof. The lever 82 is connected by the rod 81 to the bracket 92. The engaging pin 85 is mounted on the rearward end of the link 84 and adapted to come into contact with a cam portion 93 of the draft operating link 57 from behind. The rod 81 is adjustable in length by a turnbuckle 87. Each of the engaging pins 50, 85 and the fixed pin 51 carries a roller rotatably fitted thereon.

For working, the work device is attached to the rear end of the tractor body 1 by a three-point link assembly. The top link of the assembly is attached to the holder 75 by a pin inserted through the desired one of the holes 76.

First, position control will be described with reference to FIGS. 4 and 5. When to be used, the work device is held in a lowered position by shifting the position control lever 15 toward the direction of arrow D in FIG. 1 to a lowering position. At this time, the position cam 46 and the position link 49 of the position link assembly 39 are in the respective phantom-line positions in FIG. 4, and the control valve 10 is in its neutral position.

Figure 4:
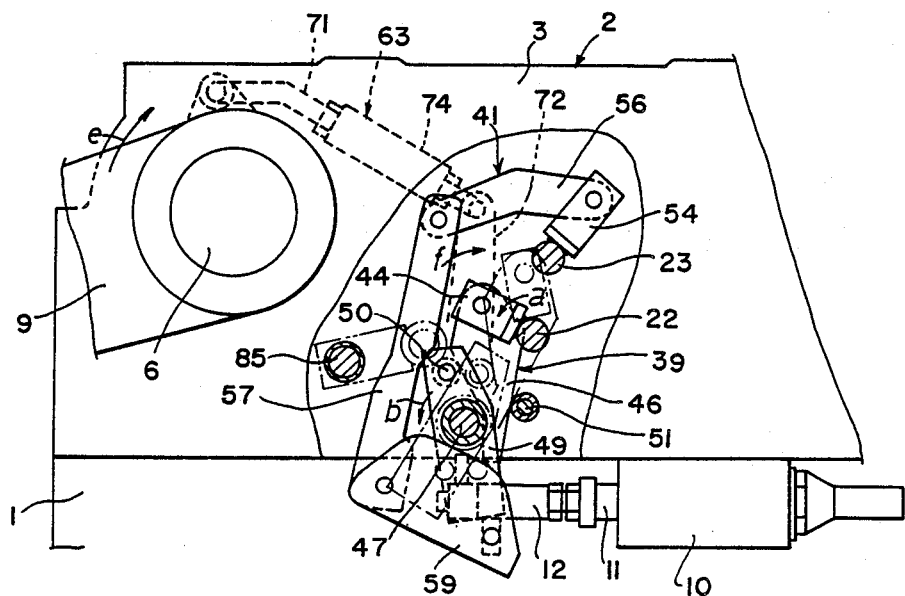
Figure 5:
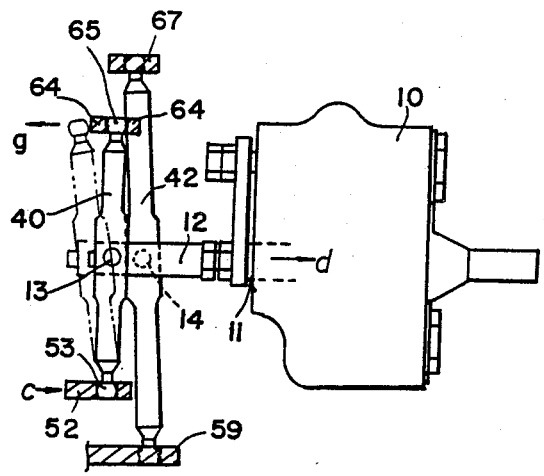

When the position control lever 15 is then shifted in the direction of arrow U in FIG. 1 to a lifting position, the position control rod 22 rotates in the direction of arrow a in FIG. 4, whereby the position cam 46 pivoted to the link 44 is inserted into the space between the fixed pin 51 and the engaging pin 50 as indicated in solid line. This moves the position link 49 about the fixed shaft 47 toward the direction of arrow b as indicated in solid line. Consequently, the position link 49 pushes the spool operating arm 40 for position control at its one end toward the direction of arrow c in FIG. 5. With the feedback link 64 in a fixed position at this time, the spool operating arm 40 pushes in the spool 11 of the control valve 10 from the position of FIG. 3 to the position of FIG. 5 in the direction of arrow d, switching the valve 10 to a lifting direction.

The valve 10 therefore operates the hydraulic unit 2 toward the lifting direction, moving the lift arms 9 about the arm shaft 6 toward the direction of arrow e in FIG. 4 to progressively lift the work device. This movement of the lift arms 9 causes the feedback rod 71 to move the feedback lever 72 about the feedback lever shaft 73 in the direction of arrow f in FIG. 4, so that the feedback link 64 moves with the shaft 73 to move the other end of the spool operating arm 40 in the direction of arrow g in FIG. 5. When the work device reaches the position set by the position control lever 15, the spool operating arm 40 is in the phantom-line position of FIG. 5, returning the spool 11 to its neutral position to bring the valve 10 to the neutral position, whereupon the hydraulic unit 2 discontinues the lifting operation.

Although the movement of the spool 11 is transmitted to the draft link assembly 41 through the spool operating arm 42 for draft control during the position control, the draft link 59, the operating link 57, etc. of the assembly 41 merely idly move, causing no trouble to position control.

Figure 7:
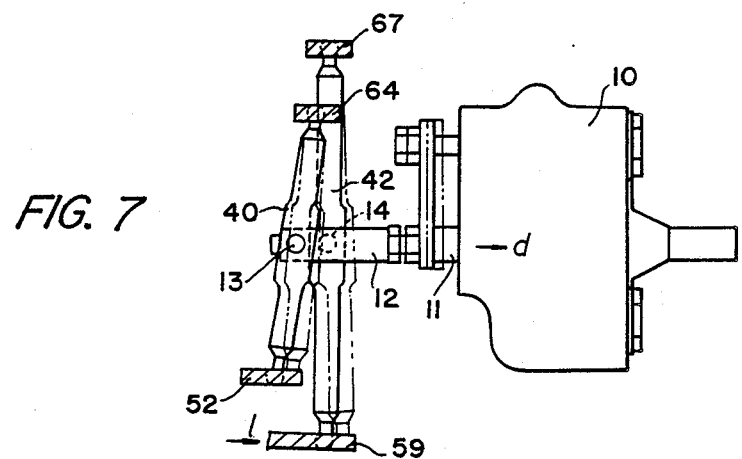

Next, position control will be described with reference to FIGS. 6 and 7. At this time, the position control lever 15 is brought toward the lowering side beyond the position control range to prevent the position cam 46 from interfering with the movement of the position link 49. On the other hand, the draft control lever 16 is set in a suitable lowering position within the draft control range. At this time, the draft operating link 57, the draft link 59, etc. of the draft link assembly 41 are in the state indicated by solid lines in FIG. 6, with the control valve 10 in its neutral position.

Figure 6:
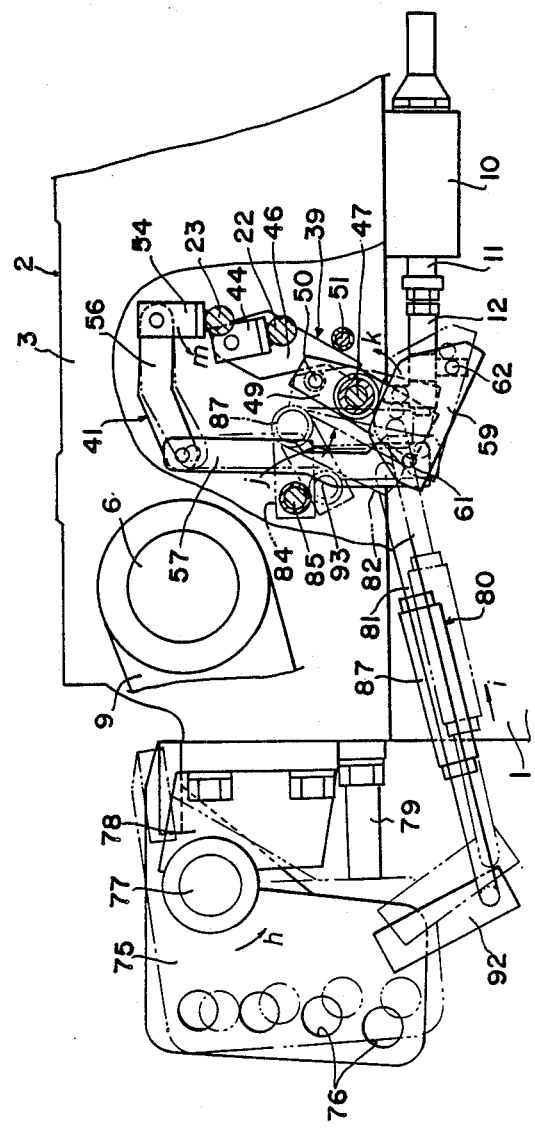

When the draft load on the work device increases, the top link holder 75 rotates from the solid-line position of FIG. 6 to the phantom-line position thereof in the direction of arrow h against the torsion bar 77, pushing the feedback rod 81 toward the direction of arrow i and thereby moving the feedback lever 82 and the feedback link 84 about the lever shaft 83 in the direction of arrow j. This movement brings the engaging pin 85 on the feedback link 84 into contact with the cam portion 93 of the draft operating link 57 to push the link 57 forward from the solid-line position to the phantom-line position. The link 57 in turn rotates the draft link 59 about the fixed shaft 47 toward the direction of arrow k, pushing one end of the spool operating arm 42 toward the direction of arrow l in FIG. 7. Consequently, the arm 42 as supported by the fixed bracket 67 is moved to the phantom-line position in FIG. 7 to push the spool 11 of the control valve 10 from the solid-line position to the phantom-line position in the direction of arrow d and switch the control valve 10 to the lifting position. As a result, the hydraulic unit operates toward the lifting direction to lift the work device.

When the draft load decreases with the lift of the work device, the top link holder 75 is returned by the torsion bar 77, so that the spool 11 of the control valve 10 returns to the solid-line position through an operation reverse to the foregoing operation to bring the valve 10 to its neutral position. Thus, the draft load on the work device is controllable to a generally constant value.

Combination control will be described. In this mode of control, the work device is operated as held in a predetermined position by position control, and the draft control system functions upon an increase in the draft load to lift the work device and maintain the load at an approximately constant value. In this control mode, the position control lever 15 is set to a lowering position within the position control range to locate the position cam 46 between the engaging pin 59 and the fixed pin 51 as seen in FIG. 6, preventing the position link 49 from moving in a direction opposite to the direction of arrow b.

Figure 8:
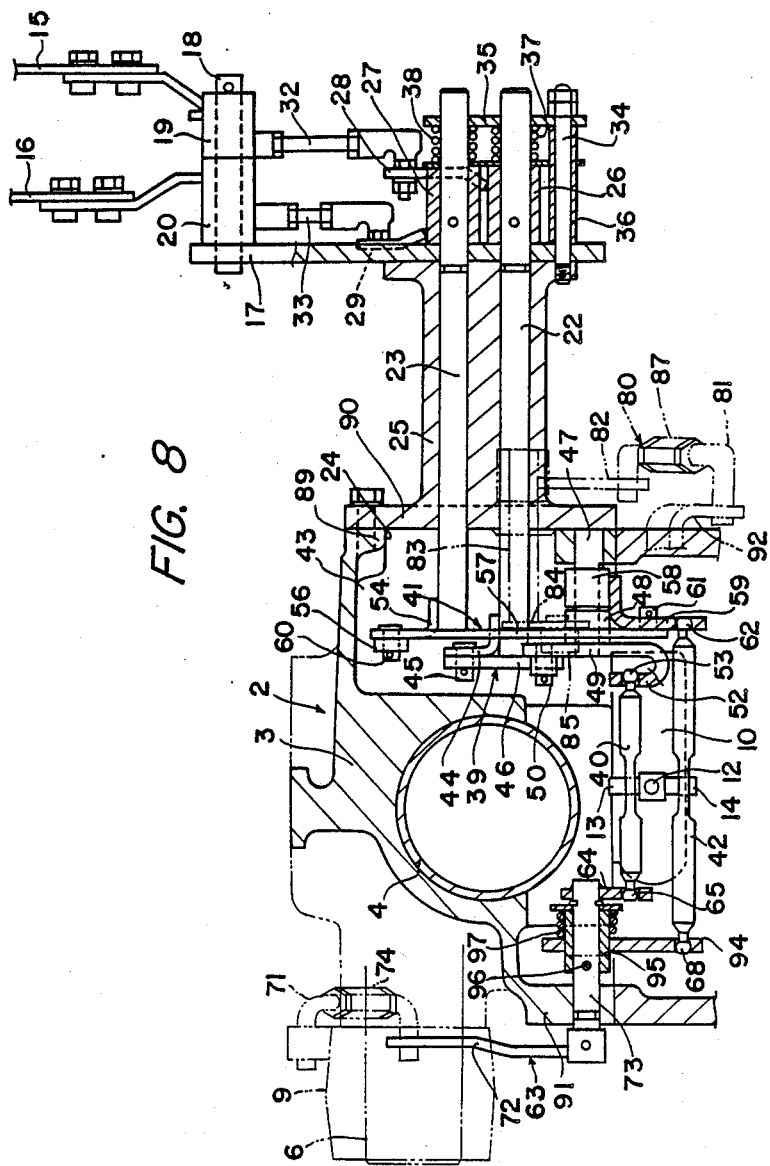
FIG. 8 to FIG. 10 show another hydraulic control apparatus as a second embodiment of the present invention.
Figure 9:
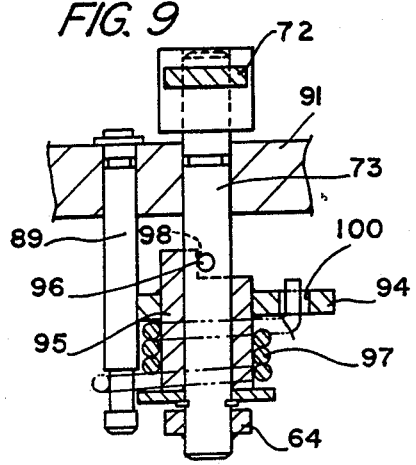
Figure 10:
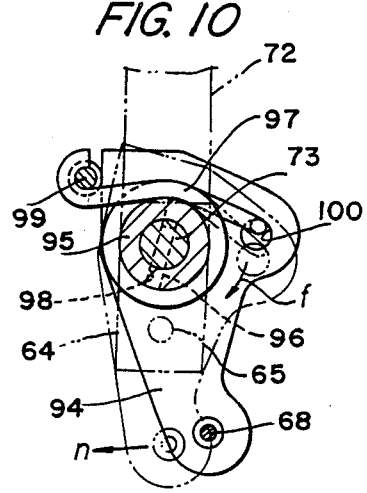

FIGS. 8 to 10 show a second embodiment of the invention wherein the other end of the draft control spool operating arm 42 is operatively connected to the position feedback assembly 63 to substantially fix the other end of the arm 42 and return the control valve 10 to the stopping position when the work device is in a lifted position during draft control.

With reference to FIG. 8, the other end of the spool operating arm 42 is connected to a connecting lever 94 by the ball joint portion 68. The lever 94 is secured to a boss portion 95, which in turn is rotatably fitted around the feedback lever shaft 73. By means of a pin 96 and a spring 97, the connecting lever 94 is operatively connected to the feedback lever shaft 73 so as to substantially fix the other end of the draft control spool operating arm 42 and return the control valve 10 to its stopping (neutral) position when the work device is in a lifted position during draft control. More specifically stated with reference to FIG. 9 and FIG. 10, one end of the boss portion 95 is partly cutout to provide an engaging portion 98, and the pin 96 in engagement therewith is fixed to the lever shaft 73. The spring 97 is fitted around the boss portion 95 and has one end engaged with a stopper pin 99 projecting from the other side wall 91 of the case 3 and the other end engaged in a hole 100 in the lever 94, whereby the connecting lever 94 is so biased as to engage the portion 98 with the pin 96. The lever 94 is held by contact with the stopper pin 99.

With the above arrangement, the work device can be forcibly lifted with ease merely by shifting the draft control lever 16 toward the lifting direction during draft control.

More specifically, when the work device is to be forcibly lifted during the draft control, the draft control lever 16 is shifted in the direction of arrow U in FIG. 1, i.e., in the lifting direction. This moves the link 54 about the draft control rod 23 in the direction of arrow m in FIG. 6, thereby causing the connecting link 56 and the draft operating link 57 to rotate the draft link 59 about the fixed shaft 47 in the direction of arrow k. Consequently, the control valve 10 is switched to the lifting position to operate the hydraulic unit 2 toward the lifting direction. When the work device reaches the upper limit position, the rotation of the lift arms 9 causes the feedback rod 71 to rotate the feedback lever 72 about the feedback lever shaft 73 in the direction of arrow f in FIG. 10 as in the case of position control, so that the pin 96 and the engaging portion 98 rotate the lever 94 to the phantom-line position in FIG. 10 to move the other end of the spool operating arm 42 in the direction of arrow n in FIG. 10. This movement of the arm 42 returns the spool 11 to the neutral position in a direction opposite to the direction of arrow d, bringing the control valve 10 to its neutral position and automatically stopping the hydraulic unit 2. Accordingly, even if the unit 2 operates to its upper limit, the relief valve included in the hydraulic circuit does not function. Thus, the work device can be forcibly lifted easily by shifting the draft control lever 16.

Figure 13:
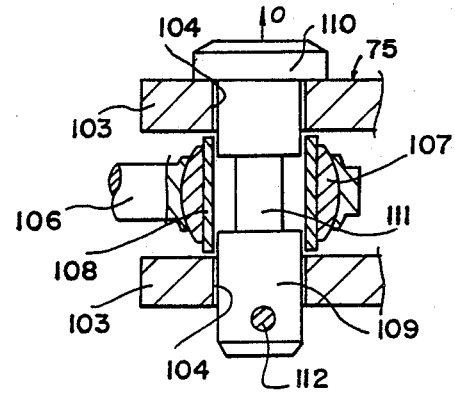
FIG. 11 to FIG. 13 show another hydraulic control apparatus as a third embodiment of the present invention.
Figure 11:
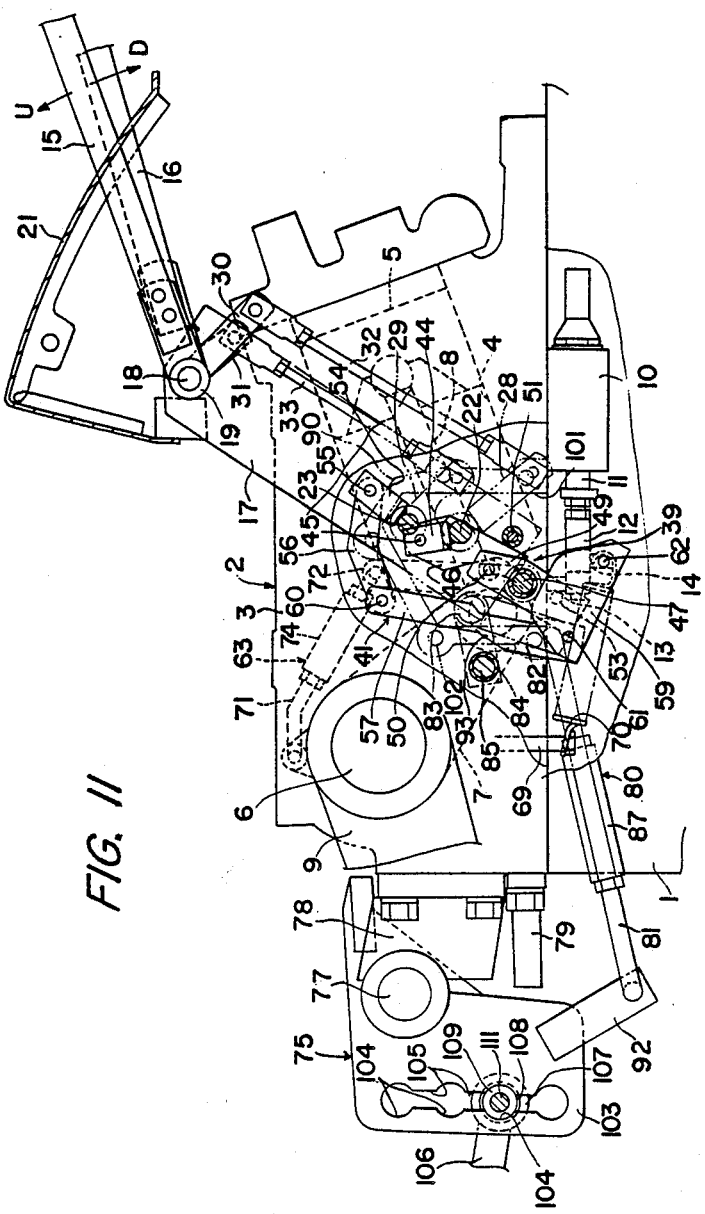
Figure 12:
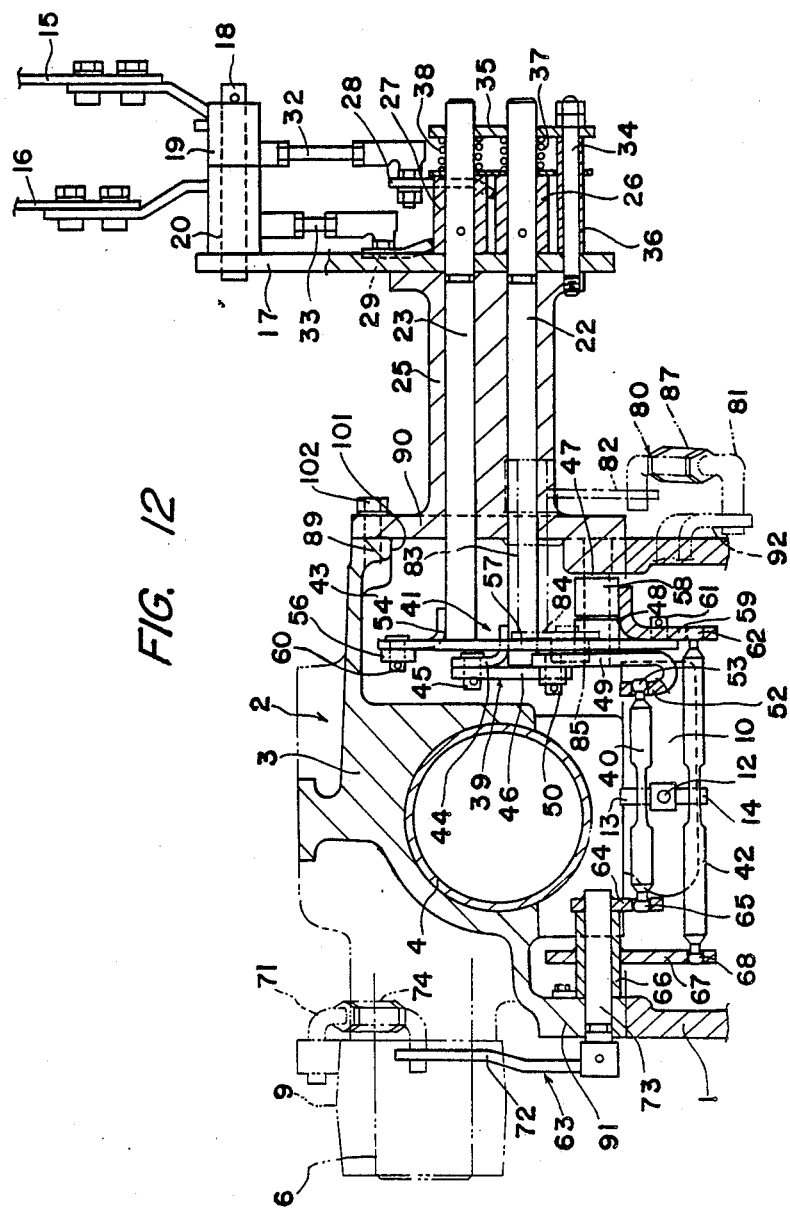

FIGS. 11 to 13 show a third embodiment of the invention which can be assembled with ease. In assembling the apparatus, the control rods 22, 23, the control levers 15, 16 and the link assemblies 39, 41 are first mounted on the support member 25, which is then attached to the case 3.

More specifically stated with reference to FIG. 12, a cutout portion 101 having an open lower side is formed in the side wall 89 of the case 3, and the flange 90 of the support member 25 is removably attached to the side wall 89 of the case with bolts 102. The fixed shaft 47 is secured to the flange 90, while the feedback lever shaft 83 is inserted through and rotatably supported by the flange.

With reference to FIGS. 11 and 13, each of a pair of brackets 103 of the top link holder 75 is formed with a plurality of attaching holes 104 arranged vertically. The holes 104 communicate with one another through slots 105. Indicated at 106 is a top link which, as seen in FIG. 13, is pivoted to the holder 75 by a connecting pin 109 inserted through a collar 108 of a ball joint portion 107. The connecting pin 109 has such a diameter that it is insertable through the attaching hole 104. The pin 109 has a head 110 at its one end and an intermediate portion of reduced diameter, 111, which is movable through the communication slot 105. Indicated at 112 is a retaining pin.

To assemble the hydraulic control apparatus, the control valve 10 is attached to the cylinder portion 4, with the hydraulic case 3 removed from the tractor body 1. The spool operating arms 40, 42 are connected to the spool 11 of the valve, with the ball joint portions 65, 68 fitted to the feedback lever 64 and the fixed bracket 67, respectively.

On the other hand, the control rods 22, 23 are inserted through the support member 25, to which the control levers 15, 16 are attached by the support plate 17, etc. The link assemblies 39, 41 are connected to the inner ends of the control rods 22, 23, respectively. Thus, all the parts including the control levers 15, 16 through the link assemblies 39, 41 are mounted on the support member 25.

Next, the control rods 22, 23 are placed into the cutout portion 101 of the hydraulic case 3 from below to cause the control rods 22, 23 to extend through the cutout portion 101 and accommodate the link assemblies 39, 41 in the space 43. The flange 90 of the support member 25 is then fastened to the side wall 89 of the case 3 with the bolts 102 to close the cutout portion 101. Under the hydraulic case 3, the ball joint portions 53, 62 of the spool operating arms 40, 42 are then fitted to the position link 49 and the draft link 59, respectively. Since the arms 40, 42 are to be positioned on the lower open side of the case 3 and under the open end thereof, the ball joint portions can be fitted to the links 49, 59 easily.

A three-point link assembly is used for attaching the work device to the tractor. The top link 106 of the three-point link assembly is pivoted to the holder 75 by inserting the connecting pin 109 through the desired pair of attaching holes 104. When another pair of attaching holes 104 is to be used, the connecting pin 109 is shifted in the direction of arrow o in FIG. 13 with the retaining pin 112 removed to position the reduced-diameter portion 111 thereof for one of the brackets 103. Since the forward end of the pin 109 is removed from the hole 104 in the other bracket 103 at this time, the pin 109 is movable through the slot 105 vertically to the contemplated hole 104. The above procedure is then followed in the reverse order.

For draft control during light civil engineering work, such as ground leveling work, using a box scraper, the device is used with the draft control lever 16 set to an upper position in the draft control range on the guide plate 21 since the draft load involved is small. Accordingly, the draft control lever 16 must be shifted a small distance by delicate manipulation.

Figure 14:
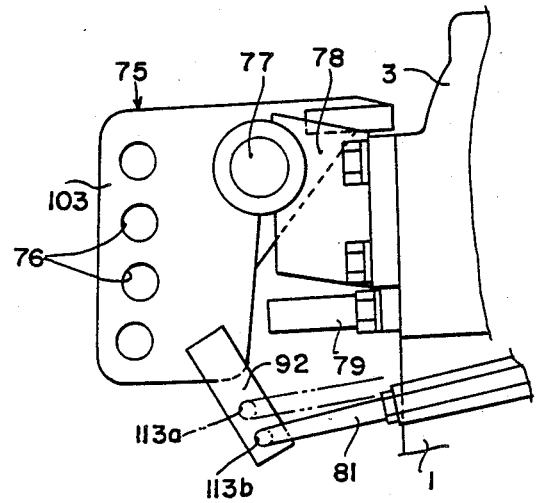
FIG. 14 is a side elevation showing the top link holder portion.

For use in such a case, the bracket 92 is formed with two connecting holes 113a 113b as seen in FIG. 14. The feedback rod 81 is attached to the bracket 92 at the hole 113a for a heavy load, or at the hole 113b for a light load. The rod 81 is then movable by an increased amount even under a light load, thus eliminating the need for the delicate manipulation of the draft control lever 16.

What is claimed is:

1. A hydraulic control apparatus for a tractor comprising:
   a control valve for controlling a hydraulic unit to power a work device to a lifting, stopping or lowering act;
   a position control lever and a draft control lever for changing over the control valve to a lifting, stopping or lowering position through position and draft link assemblies respectively;
   a position feedback assembly for returning the control valve to the stopping position when the work device is lifted or lowered to a position set by the position control lever;
   a draft feedback assembly for switching the control valve to maintain the draft load on the work device at an approximately constant amount in response to the set position of the draft control lever; and
   a position control spool operating arm pivotally connected to a spool of the control valve in an intersecting relation therewith and having one end connected to the position link assembly and the other end connected to the position feedback assembly, the apparatus being characterized in that a draft control spool operating arm separate from the position control spool operating arm is pivotally connected to the spool in intersecting relation therewith at a point intermediate the draft control spool operating arm's ends and has one of said ends connected to the draft link assembly and the other of said ends associated to a bracket, wherein the draft feedback assembly is operatively connected to the draft link assembly.

2. An apparatus as defined in claim 1, wherein the other end of the draft control spool operating arm is rotatably mounted to the bracket which is fixed to an immobile member.

3. An apparatus as defined in claim 1, wherein the other end of the draft control spool operating arm is rotatably mounted to the bracket which is associated with the position feedback assembly.

4. An apparatus as defined in claim 1, wherein the position control spool operating arm and the draft control spool operating arm are separately arranged above and below the spool respectively.

5. An apparatus as defined in claim 1, wherein a pair of joint pins are provided on the upper and lower sides of the spool respectively, and the position control spool operating arm and the draft control spool operating arm are pivotably supported by the joint pins.

6. An apparatus as defined in claim 1 wherein the control valve is provided under a cylinder portion of the hydraulic unit, and the position control spool operating arm and the draft control spool operating arm are arranged under the cylinder portion transversely thereof.

7. An apparatus as defined in claim 1, wherein a space is provided between a cylinder portion of the hydraulic unit and a side wall of the hydraulic unit, and the position and draft link assemblies are accommodated in the space.

8. An apparatus as defined in claim 1, wherein a support member is provided with a position control rod coupled to the position control lever and a draft control rod coupled to the draft control lever, and the support member is attached to a case of the hydraulic unit to close an opening at one side of the case, the position control rod and the draft control rod being connected within the case to the position link assembly and the draft link assembly respectively.

9. An apparatus as defined in claim 1, wherein the draft link assembly comprises a connecting link operatively connected to the draft control lever, a draft link rotatably supported by a fixed shaft and connected to the draft control spool operating arm, and a draft operating link interconnecting the connecting link and the draft link, and the draft feedback assembly includes a feedback link with an engaging pin adapted to contact the draft operating link.

10. An apparatus as defined in claim 1, wherein the position link assembly connected to the position control spool operating arm includes a position link, and the draft link assembly connected to the draft control spool operating arm includes a draft link, the position link and the draft link being rotatably supported commonly by a fixed shaft.

11. An apparatus as defined in claim 10, wherein the position feedback assembly includes a feedback lever shaft in alignment with the fixed shaft, and the other end of the position control spool operating arm is connected to a feedback link secured to the feedback lever shaft.

12. An apparatus as defined in claim 1, wherein the other end of the draft control spool operating arm is connected to a connecting lever and the position feedback assembly includes a feedback lever shaft having the connecting lever fitted therearound and supported thereby.

13. An apparatus as defined in claim 12, wherein the feedback lever shaft is rotatably connected to the connecting lever and has a pin for rotating the connecting lever with the lever shaft when the lever shaft rotates with the lift of the work device, the lever shaft being provided with a spring for biasing the connecting lever in a return direction.

14. An apparatus as defined in claim 13, wherein the connecting lever has a boss portion fitted around the feedback lever shaft, and the spring is provided around the boss portion.

* * * * *